US006443570B1

(12) United States Patent
Chu et al.

(10) Patent No.: US 6,443,570 B1
(45) Date of Patent: Sep. 3, 2002

(54) INK JET PRINTING METHOD

(75) Inventors: Lixin Chu; Sridhar Sadasivan, both of Rochester; John M. Baier, Fairport; Elizabeth A. Gallo, Penfield, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/944,619

(22) Filed: Aug. 31, 2001

(51) Int. Cl.[7] .......................... G01D 11/00
(52) U.S. Cl. .......................... 347/100; 347/105; 428/195
(58) Field of Search .......................... 347/100, 101, 347/105; 428/195

(56) References Cited

U.S. PATENT DOCUMENTS

| | | | | | |
|---|---|---|---|---|---|
| 5,660,928 | A | * | 8/1997 | Stokes et al. | 347/105 |
| 5,696,182 | A | * | 12/1997 | Kashiwazaki et al. | 347/100 |
| 5,747,146 | A | * | 5/1998 | Kashiwazaki et al. | 428/195 |
| 5,965,244 | A | * | 10/1999 | Tang et al. | 347/105 |
| 6,110,585 | A | * | 8/2000 | Shaw-Klein | 347/105 |

FOREIGN PATENT DOCUMENTS

| | | |
|---|---|---|
| WO | WO 00/01539 | 1/2000 |

* cited by examiner

*Primary Examiner*—John Barlow
*Assistant Examiner*—Manish S. Shah
(74) *Attorney, Agent, or Firm*—Harold E. Cole

(57) ABSTRACT

An ink jet printing method having the steps of: I) providing an ink jet printer that is responsive to digital data signals; II) loading the printer with an ink jet recording element having a support having thereon a porous image-receiving layer having at least about 50% by weight of particles and less than about 20% by weight of a binder, the particles comprising a mixture of (a) inorganic particles having a primary particle size of from about 7 to about 40 nm in diameter which may be aggregated to provide a mean aggregate particle size of up to about 500 nm; and (b) colloidal particles having a mean particle size of from about 20 to about 500 nm; and wherein the difference between the mean aggregate particle size of the (a) inorganic particles and the mean particle size of the (b) colloidal particles is within about 10%; III) loading the printer with an ink jet ink composition; and IV) printing on the image-receiving layer using the ink jet ink composition in response to the digital data signals.

18 Claims, No Drawings

INK JET PRINTING METHOD

CROSS REFERENCE TO RELATED APPLICATIONS

Reference is made to commonly assigned, co-pending U.S. patent applications:

Ser. No. 09/944,618 by Sadasivan et al., filed Aug. 31, 2001, entitled "Ink Jet Recording Element";

Ser. No. 09/943,952 by Sadasivan et al., filed Aug. 31, 2001, entitled "Ink Jet Recording Element";

Ser. No. 09/944,555 by Chu et al., filed Aug. 31, 2001, entitled "Ink Jet Printing Method";

Ser. No. 09/944,547 by Sadasivan et al., filed Aug. 31, 2001, entitled "Ink Jet Recording Element"; and Ser. No. 09/945,088 by Gallo et al., filed Aug. 31, 2001, entitled "Ink Jet Printing Method".

Ser. No. 09/943,957 by Sadasivan et al., filed Aug. 31, 2001, entitled "Ink Jet Recording Element";

Ser. No. 09/945,035 by Gallo et al., filed Aug. 31, 2001, entitled "Ink Jet Printing Method";

Ser. No. 09/944,971 by Sadasivan et al., filed Aug. 31, 2001, entitled "Ink Jet Recording Element";

Ser. No. 09/945,085 by Gallo et al., filed Aug. 31, 2001, entitled "Ink Jet Printing Method";

FIELD OF THE INVENTION

This invention relates to an inkjet printing method using an ink jet recording element, more particularly to a porous ink jet recording element.

BACKGROUND OF THE INVENTION

In a typical ink jet recording or printing system, ink droplets are ejected from a nozzle at high speed towards a recording element or medium to produce an image on the medium. The ink droplets, or recording liquid, generally comprise a recording agent, such as a dye or pigment, and a large amount of solvent. The solvent, or carrier liquid, typically is made up of water and an organic material such as a monohydric alcohol, a polyhydric alcohol or mixtures thereof.

An ink jet recording element typically comprises a support having on at least one surface thereof an ink-receiving or image-receiving layer, and includes those intended for reflection viewing, which have an opaque support, and those intended for viewing by transmitted light, which have a transparent support.

An important characteristic of ink jet recording elements is their need to dry quickly after printing. To this end, porous recording elements have been developed which provide nearly instantaneous drying as long as they have sufficient thickness and pore volume to effectively contain the liquid ink. For example, a porous recording element can be manufactured by cast coating, in which a particulate-containing coating is applied to a support and is dried in contact with a polished smooth surface.

In addition, when a porous recording element is printed with dye-based inks, the dye molecules penetrate the coating layers. However, there is a problem with such porous recording elements in that the optical densities of images printed thereon are lower than one would like. The lower optical densities are believed to be due to optical scatter that occurs when the dye molecules penetrate too far into the porous layer.

World Publication 00/01539 discloses a porous inkjet recording element containing first and second group particles, the first group having metal oxide particles which are aggregates of smaller, primary particles with a mean diameter of the aggregates from about 100 nm to about 500 nm and the second group comprising of particles with a mean diameter less than 50% of the mean diameter of the aggregates in the first group. However, there is a problem with this recording element in that it has a poor dry time as will be shown hereinafter.

It is an object of this invention to provide an inkjet printing method using a porous ink jet recording element that has a good image quality with good gloss and has an excellent dry time.

SUMMARY OF THE INVENTION

These and other objects are achieved in accordance with the invention which comprise an ink jet printing method comprising the steps of:

I) providing an inkjet printer that is responsive to digital data signals;

II) loading the printer with an ink jet recording element comprising a support having thereon a porous image-receiving layer comprising at least about 50% by weight of particles and less than about 20% by weight of a binder, the particles comprising a mixture of (a) inorganic particles having a primary particle size of from about 7 to about 40 nm in diameter which may be aggregated to provide a mean aggregate particle size of up to about 500 nm; and (b) colloidal particles having a mean particle size of from about 20 to about 500 nm;

and wherein the difference between the mean aggregate particle size of the inorganic particles and the mean particle size of the colloidal particles is within about 10%;

III) loading the printer with an inkjet ink composition; and

IV) printing on the image-receiving layer using the ink jet ink composition in response to the digital data signals.

By use of the method of the invention, a porous inkjet recording element is obtained that has a good image quality with good gloss and has an excellent dry time.

DETAILED DESCRIPTION OF THE INVENTION

The porous image-receiving layer useful in the invention comprises at least about 50% by weight of particles, preferably from about 80–90% by weight, and less than about 20% by weight of binder. This amount of binder will insure that the layer is porous, i.e., have interconnecting voids so that a solvent in the ink jet ink used in printing on the recording element can travel through the image-receiving layer to a support or base layer if one is present.

Examples of (a) inorganic particles useful in the invention include alumina, boehmite, hydrated alumina, silica, titanium dioxide, zirconium dioxide, clay, calcium carbonate, inorganic silicates or barium sulfate. The particles may be porous or nonporous. In a preferred embodiment of the invention, the (a) inorganic particles are metallic oxides, preferably fumed. Preferred examples of fumed metallic oxides which may be used include silica and alumina fumed oxides. Fumed oxides are available in dry form or as dispersions of the aggregates.

In another preferred embodiment of the invention, the (a) inorganic particles may be in the form aggregated particles. The aggregates are comprised of smaller primary particles about 7 to about 40 nm in diameter, and are aggregated up to about 500 nm in diameter. In still another preferred embodiment, the (a) inorganic particles have a mean aggregate particle size of from about 50 nm to about 200 nm.

Examples of (b) colloidal particles useful in the invention include alumina, boehmite, hydrated alumina, silica, titanium dioxide, zirconium dioxide, clay, calcium carbonate, inorganic silicates, barium sulfate or organic particles such as polymeric beads. Examples of organic particles useful in the invention are disclosed and claimed in U.S. patent application Ser. Nos: 09/458,401, filed Dec. 10, 1999; Ser. No. 09/608,969, filed Jun. 30, 2000; Ser. No. 09/607,417, filed Jun. 30, 2000; Ser. No. 09/608,466 filed Jun. 30, 2000; Ser. No. 09/607,419, filed Jun. 30, 2000; and Ser. No. 9/822,731, filed Mar. 30, 2001; the disclosures of which are hereby incorporated by reference. In a preferred embodiment of the invention, the (b) colloidal particles are silica, alumina, boehmite or hydrated alumina. The particles may be porous or nonporous. In another preferred embodiment of the invention, the (b) colloidal particles may be in the form of primary particles. In yet another preferred embodiment of the invention, the mean particle size of the primary particles may range from about 20 nm to about 500 nm.

In a preferred embodiment of the invention, the first (a) inorganic particles comprise from about 5 to about 25% by weight of the particle mixture. In another preferred embodiment, the first (a) inorganic particles have a mean aggregate particle size of from about 50 nm to about 200 nm. In yet another preferred embodiment, the (b) colloidal particles have a mean particle size of from about 50 nm to about 200 nm.

The above particles are preferred for ink jet recording elements because they possess positively charged surfaces, which are capable of binding anionic ink jet printing dyes, rendering printed images resistant to dye migration due to water and high humidity conditions.

It has been found that the size difference between the (a) first inorganic particles and the (b) colloidal particles determines the dry time of the ink jet recording element. If the mean particle size of the (b) particles is much smaller than the mean aggregate particle size of the (a) first inorganic particles, then the (b) colloidal particles may fill in the void space between the (a) first inorganic particles in the dry coating, which would reduce the porosity of the image-receiving layer. A reduction in porosity of the image-receiving layer would reduce the dry time of the image-recording element.

In general, any binder may be used in the image-receiving layer used in the invention. In a preferred embodiment, the binder is a hydrophilic polymer such as poly(vinyl alcohol), poly(vinyl pyrrolidone), gelatin, cellulose ethers, poly (oxazolines), poly(vinylacetamides), partially hydrolyzed poly(vinyl acetate/vinyl alcohol), poly(acrylic acid), poly (acrylamide), poly(alkylene oxide), sulfonated or phosphated polyesters and polystyrenes, casein, zein, albumin, chitin, chitosan, dextran, pectin, collagen derivatives, collodian, agar-agar, arrowroot, guar, carrageenan, tragacanth, xanthan, rhamsan and the like. In another preferred embodiment, the hydrophilic binder is poly(vinyl alcohol). The polymeric binder should be chosen so that it is compatible with the aforementioned particles.

The thickness of the image-receiving layer may range from about 5 to about 40 μm, preferably from about 10 to about 20 μm. The coating thickness required is determined through the need for the coating to act as a sump for absorption of ink solvent and the need to hold the ink near the coating surface. The coating may be applied in a single layer or in multiple layers so the functionality of each coating layer may be specified; for example, a two-layer structure can be created wherein the base coat functions as a sump for absorption of ink solvent while the top coat holds the ink.

In a preferred embodiment, the recording element also contains a base layer having at least about 50% by weight of inorganic particles. The base layer is coated between the support and the image-receiving layer. In another preferred embodiment, the inorganic particles in the base layer comprise calcium carbonate, magnesium carbonate, barium sulfate, silica, alumina, boehmite, hydrated alumina, clay or titanium oxide. In another preferred embodiment, the inorganic particles in the base layer have an anionic surface charge. In yet another preferred embodiment, the inorganic particles in the base layer have a mean particle size of from about 100 nm to about 5 μm.

In still another preferred embodiment, the base layer contains a binder such as a polymeric material and/or a latex material, such as poly(vinyl alcohol) and/or styrene-butadiene latex. In still another preferred embodiment, the binder in the base layer is present in an amount of from about 5 to about 20 weight %. In still another preferred embodiment, the thickness of the base layer may range from about 5 μm to about 50 μm, preferably from about 20 to about 40 μm.

After coating, the inkjet recording element used in the invention may be subject to calendering or supercalendering to enhance surface smoothness. In a preferred embodiment of the invention, the ink jet recording element is subject to hot, soft-nip calendering at a temperature of about 65° C. and pressure of 14000 kg/m at a speed of from about 0.15 m/s to about 0.3 m/s.

The support for the ink jet recording element used in the invention can be any of those usually used for ink jet receivers, such as resin-coated paper, paper, polyesters, or microporous materials such as polyethylene polymer-containing material sold by PPG Industries, Inc., Pittsburgh, Pennsylvania under the trade name of Teslin®, Tyvek® synthetic paper (DuPont Corp.), and OPPalyte® films (Mobil Chemical Co.) and other composite films listed in U.S. Pat. No. 5,244,861. Opaque supports include plain paper, coated paper, synthetic paper, photographic paper support, melt-extrusion-coated paper, and laminated paper, such as biaxially oriented support laminates. Biaxially oriented support laminates are described in U.S. Pat. Nos. 5,853,965; 5,866,282; 5,874,205; 5,888,643; 5,888,681; 5,888,683; and 5,888,714, the disclosures of which are hereby incorporated by reference. These biaxially oriented supports include a paper base and a biaxially oriented polyolefin sheet, typically polypropylene, laminated to one or both sides of the paper base. Transparent supports include glass, cellulose derivatives, e.g., a cellulose ester, cellulose triacetate, cellulose diacetate, cellulose acetate propionate, cellulose acetate butyrate; polyesters, such as poly(ethylene terephthalate), poly(ethylene naphthalate), poly(1,4-cyclohexanedimethylene terephthalate), poly(butylene terephthalate), and copolymers thereof; polyimides; polyamides; polycarbonates; polystyrene; polyolefins, such as polyethylene or polypropylene; polysulfones; polyacrylates; polyetherimides; and mixtures thereof. The papers listed above include a broad range of papers, from high end papers, such as photographic paper to low end papers, such as newsprint.

The support used in the invention may have a thickness of from about 50 to about 500 μm, preferably from about 75 to 300 μm. Antioxidants, antistatic agents, plasticizers and other known additives may be incorporated into the support, if desired.

Coating compositions employed in the invention may be applied by any number of well known techniques, including dip-coating, wound-wire rod coating, doctor blade coating, gravure and reverse-roll coating, slide coating, bead coating, extrusion coating, curtain coating and the like. Known coating and drying methods are described in further detail in Research Disclosure no. 308119, published December 1989, pages 1007 to 1008. Slide coating is preferred, in which the base layers and overcoat may be simultaneously applied. After coating, the layers are generally dried by simple evaporation, which may be accelerated by known techniques such as convection heating.

In order to impart mechanical durability to an ink jet recording element, crosslinkers which act upon the binder discussed above may be added in small quantities. Such an additive improves the cohesive strength of the layer. Crosslinkers such as carbodiimides, polyfunctional aziridines, aldehydes, isocyanates, epoxides, polyvalent metal cations, and the like may all be used.

To improve colorant fade, UV absorbers, radical quenchers or antioxidants may also be added to the image-receiving layer as is well known in the art. Other additives include adhesion promoters, rheology modifiers, biocides, lubricants, dyes, optical brighteners, matte agents, antistatic agents, etc.

The coating composition can be coated so that the total solids content will yield a useful coating thickness, and for particulate coating formulations, solids contents from 10–60% are typical.

Ink jet inks used to image the recording elements used in the present invention are well-known in the art. The ink compositions used in ink jet printing typically are liquid compositions comprising a solvent or carrier liquid, dyes or pigments, humectants, organic solvents, detergents, thickeners, preservatives, and the like. The solvent or carrier liquid can be solely water or can be water mixed with other water-miscible solvents such as polyhydric alcohols. Inks in which organic materials such as polyhydric alcohols are the predominant carrier or solvent liquid may also be used. Particularly useful are mixed solvents of water and polyhydric alcohols. The dyes used in such compositions are typically water-soluble direct or acid type dyes. Such liquid compositions have been described extensively in the prior art including, for example, U.S. Pat. Nos. 4,381,946; 4,239,543 and 4,781,758, the disclosures of which are hereby incorporated by reference.

The following examples further illustrate the invention.

EXAMPLES

Control Element C-1 (Mixture of particles with Greatly Different Particle Sizes in the Image-receiving Layer) (WO 00/01539)

A coating solution for a base layer was prepared by mixing 100 dry g of precipitated calcium carbonate Albagloss-s® (Specialty Minerals Inc.) as a 70% solution and 8.5 dry g of silica gel Gasil® 23F (Crosfield Ltd.) with 0.5 dry g of poly(vinyl alcohol) Gohsenol® GH-17 (Nippon Gohsei Co., Ltd.) as a 10% solution and 5 dry g of styrene-butadiene latex CP692NA® (Dow Chemicals) as a 50% solution. The solids of the coating solution was adjusted to 35% by adding water.

The base layer coating solution was bead-coated at 25° C. on a base paper, Nekoosa Solutions Smooth® (Georgia Pacific), Grade 5128 (Carrara White®, Color 9220), basis weight 150 g/m$^2$, and dried at 60° C. by forced air. The thickness of the base coating was 25 μm or 27 g/m$^2$.

A coating solution for the image-receiving layer was prepared by mixing 100 dry g of colloidal silica Ludox® Cl (DuPont Corp.) as a 30% solution and 30 dry g of fumed alumina Cab-O-Sperse® PG003 (Cabot Corp.) as a 40% solution with 4 dry g of poly(vinyl alcohol) Gohsenol® GH-17 (Nippon Gohsei Co. Ltd.) as a 10% solution and 0.1 dry g of 2,3-dihydroxy-1,4-dioxane (Clariant Corp). The solids of the coating solution was adjusted to 20% by adding water. The mean particle size of the Ludox® Cl colloidal silica was only 10 nm while the mean aggregate size of the Cab-O-Sperse® PG003fumed alumina was 130 nm.

The image-receiving layer coating solution was coated on top of the base layer described above. The recording element was then dried at 60° C. by forced air to yield a two-layer recording element. The thickness of the image-receiving layer was 8 μm or 8.6 g/m$^2$.

The recording element was then calendared at 0.15 (m/min) with a 14000 (kg/m) pressure at 60° C.

Element 1 of the Invention

This element was prepared the same as Control Element C-1 except that 100 dry g of alumina Dispal® 14N4-80 (Condea Vista Co.) as 20% solution was added in place of Ludox® Cl to the image-receiving layer coating solution. The mean particle size of the Dispal® 14N4-80 was 120 nm and the mean aggregate size of the Cab-O-Sperse® PG003 was 130 nm (the size difference is within 10%).

Element 2 of the Invention

This element is the same as Element 1 of the invention except that the amount of Cab-O-Sperse® PG003 was 10 dry g.

Element 3 of the Invention

This element is the same as Element 1 of the invention except that the amount of Cab-O-Sperse® PG003 was 20 dry g.

Comparison Element C-2

This element was prepared the same as Element 1 of the invention except that it omitted the Dispal® 14N4-80.

Comparison Element C-3

This element was prepared the same as Element 1 of the invention except that it omitted the Cab-O-Sperse® PG003.

Gloss

The above recording elements were measured for 60° specular glossiness using a Gardener® Gloss Meter.

Printing

Images were printed using an Epson Stylus Color 740 printer for dye-based inks using Color Ink Cartridge S020191/IC3CL01. The images comprised a series of cyan, magenta, yellow, black, green, red and blue strips, each strip being in the form of a rectangle 0.8 cm in width and 20 cm in length.

Dry Time

Immediately after ejection from the printer, a piece of bond paper was placed over the printed image and rolled with a smooth, heavy weight. Then the bond paper was separated from the printed image. The length of the color strip transferred to the bond paper was measured and is proportional to the time needed for the printed image to dry. The dry time is rated as 1 when there is no transfer of the inks to the bond paper, and is considered acceptable. If there is a full transfer of at least one color strip, the dry time is rated as 5, and is unacceptable. Intermediate transfer lengths are rated between 1 and 5.

Image Quality

The image quality was evaluated subjectively. Coalescence refers to the non-uniformity or puddling of the ink in solid filled areas. Bleeding refers to the inks flowing out of its intended boundaries. The following results were obtained:

TABLE

| Element | Gloss | Dry Time | Image Quality |
|---|---|---|---|
| 1 (Invention) | 47 | 1 | No coalescence and no bleeding |
| 2 (Invention) | 48 | 1 | No coalescence and no bleeding |
| 3 (Invention) | 48 | 1 | No coalescence and no bleeding |
| C-1 (Control) | 40 | 3 | Bad coalescence and bad bleeding |
| C-2 (Comparison) | 10 | 1 | No coalescence and no bleeding |
| C-3 (Comparison) | 45 | 2 | Some coalescence and some bleeding |

The above data show that the elements employed in the invention had high gloss, good dry time and good image quality, as compared to the control and comparison elements which did not have all of these properties at the same time.

The invention has been described in detail with particular reference to certain preferred embodiments thereof, but it will be understood that variations and modifications can be effected within the spirit and scope of the invention.

What is claimed is:

1. An ink jet printing method comprising the steps of:

I) providing an ink jet printer that is responsive to digital data signals;

II) loading said printer with an ink jet recording element comprising a support having thereon a porous image-receiving layer comprising at least about 50% by weight of particles and less than about 20% by weight of a binder, said particles comprising a mixture of (a) inorganic particles having a primary particle size of from about 7 to about 40 nm in diameter which may be aggregated to provide a mean aggregate particle size of up to about 500 nm; and (b) colloidal particles having a mean particle size of from about 20 to about 500 nm; and wherein the difference between said mean aggregate particle size of said inorganic particles and said mean particle size of said colloidal particles is within about 10%;

III) loading said printer with an ink jet ink composition; and

IV) printing on said image-receiving layer using said ink jet ink composition in response to said digital data signals.

2. The method of claim 1 wherein said (a) inorganic particles are alumina, boehmite, hydrated alumina, silica, titanium dioxide, zirconium dioxide, clay, calcium carbonate, inorganic silicates or barium sulfate.

3. The method of claim 1 wherein said (b) colloidal particles are alumina, boehmite, hydrated alumina, silica, titanium dioxide, zirconium dioxide, clay, calcium carbonate, inorganic silicates, barium sulfate or organic particles.

4. The method of claim 1 wherein said (a) inorganic particles comprise fumed alumina or fumed silica.

5. The method of claim 1 wherein said (a) inorganic particles comprise from about 5 to about 25% by weight of said mixture.

6. The method of claim 1 wherein said (b) colloidal particles comprise alumina, boehmite, hydrated alumina or silica.

7. The method of claim 1 wherein said (a) inorganic particles have a mean aggregate particle size of from about 50 nm to about 200 nm.

8. The method of claim 1 wherein said (b) colloidal particles have a mean particle size of from about 50 nm to about 200 nm.

9. The method of claim 1 wherein said (a) inorganic particles and said (b) colloidal particles are positively charged.

10. The method of claim 1 wherein said binder is a hydrophilic polymer.

11. The method of claim 8 wherein said hydrophilic binder is poly(vinyl alcohol).

12. The method of claim 1 wherein said porous image-receiving layer comprises from about 80 to about 90% by weight of said inorganic particles.

13. The method of claim 1 wherein a base layer is present between said support and said image-receiving layer.

14. The method of claim 13 wherein said base layer comprises at least about 50% by weight of inorganic particles and less than about 20% by weight of a binder.

15. The method of claim 14 wherein said inorganic particles comprise calcium carbonate, magnesium carbonate, barium sulfate, silica, alumina, boehmite, hydrated alumina, clay or titanium oxide.

16. The method of claim 14 wherein said inorganic particles in said base layer are negatively charged.

17. The method of claim 14 wherein said binder in said base layer comprises a polymeric material and/or a latex material.

18. The method of claim 17 wherein said binder is poly(vinyl alcohol) and/or styrene-butadiene latex.

* * * * *